United States Patent [19]

Maeda

[11] Patent Number: 4,926,727
[45] Date of Patent: May 22, 1990

[54] CUTTING DEVICE FOR CUTTING STRIP OF RECORDING MEDIUM

[75] Inventor: Yutaka Maeda, Osaka, Japan
[73] Assignee: Minolta Camera Kabushiki Kaisha, Osaka, Japan
[21] Appl. No.: 231,212
[22] Filed: Aug. 11, 1988
[30] Foreign Application Priority Data

Aug. 21, 1987 [JP] Japan .................................. 62-127897

[51] Int. Cl.$^5$ .............................................. B26D 5/20
[52] U.S. Cl. ........................................ 83/203; 83/282; 83/649
[58] Field of Search ................... 83/203, 204, 205, 259, 83/261, 279, 280, 282, 374, 375, 436, 453, 524, 649

[56] References Cited

U.S. PATENT DOCUMENTS

| | | | |
|---|---|---|---|
| 978,535 | 12/1910 | Armstrong | 83/282 X |
| 2,693,235 | 11/1954 | Kenworthy et al. | 83/282 X |
| 3,318,179 | 5/1967 | Elsas | 83/282 X |
| 3,410,161 | 11/1968 | Roch | 83/282 X |
| 3,682,543 | 8/1972 | Iwamoto | 83/203 X |
| 3,813,976 | 6/1974 | Greer | 83/211 |
| 3,937,112 | 2/1976 | Geeson | 83/203 X |
| 4,699,031 | 10/1987 | D'Angelo et al. | 83/261 X |

FOREIGN PATENT DOCUMENTS 50-11635 5/1975 Japan .
58-22740 5/1983 Japan .

*Primary Examiner*—Frank T. Yost
*Assistant Examiner*—Eugenia A. Jones
*Attorney, Agent, or Firm*—Wenderoth, Lind & Ponack

[57] ABSTRACT

The present invention relates to a cutting device for use as a feeder for cutting a strip of recording medium in the form of a roll into sheets and for feeding each sheet to the image forming unit of a copying machine or like image forming apparatus. A device embodying the present invention comprises a pair of delivery rollers, a cutter, and a holding member. In the device of the present invention, the strip of the recording medium from the roll is delivered by the delivery rollers by a specified length, cut by the cutter into the sheet, and thereafter held by the holding member at the leading end of the strip from the roll, and the delivery rollers are then retracted from the strip.

21 Claims, 4 Drawing Sheets

CUTTING DEVICE FOR CUTTING STRIP OF RECORDING MEDIUM

BACKGROUND OF THE INVENTION

The present invention relates to a device for cutting a strip of recording medium, such as sensitized paper or copy paper, into a predetermined length.

The device is used as a feeder for cutting a strip of recording medium in the form of a roll into sheets and feeding each sheet to the image forming unit of a copying machine or like image forming apparatus.

Such cutting devices for use with a roll of recording medium are generally adapted to transport the medium by a specified length with a pair of delivery rollers in nipping contact therewith and thereafter cut the medium with a cutter. With these conventional cutting devices, the medium is held nipped between the delivery rollers also when the medium is not transported so as to obviate the likelihood that the medium will be inadvertently paid off or rewound, for example, owing to the curl of the medium and to thereby assure accurate cutting. Accordingly, when the medium is held nipped between the delivery rollers for a prolonged period of time, the nip of the roller leaves an impression on the medium and impairs the quality of the sheet of medium thereafter cut off. Especially when the medium is a sensitized one having a photosensitive layer of silver chloride or the like on its surface, the medium is susceptible to impression and must therefore be protected therefrom.

SUMMARY OF THE INVENTION

The main object of the present invention is to provide an improved cutting device.

Another object of the invention is to provide a cutting device capable of cutting a strip of recording medium with higher accuracy.

Another object of the invention is to provide a cutting device adapted to feed sheets of recording medium of good quality free from any impression.

These and other objects of the present invention can be fulfilled by a cutting device comprising:

a pair of delivery rollers for transporting a strip of recording medium in nipping contact therewith, the pair of delivery rollers being movable between a first position where the rollers nip the strip and a second position where the rollers are retracted from the strip, cutting means disposed downstream from the pair of delivery rollers with respect to the direction of delivery of the strip for cutting the strip as transported by the pair of delivery rollers by a specified length, holding means provided between the pair of delivery rollers and the cutting means for holding the leading end of the strip cut by the cutting means, and control means for controlling energization and deenergization of the pair of delivery rollers, the cutting means and the holding means, the control means being operable to energize the delivery roller, energize the cutting means a predetermined period of time thereafter, subsequently energize the holding means to hold the strip leading end and retract the pair of delivery rollers.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE INVENTION

Figure 1:
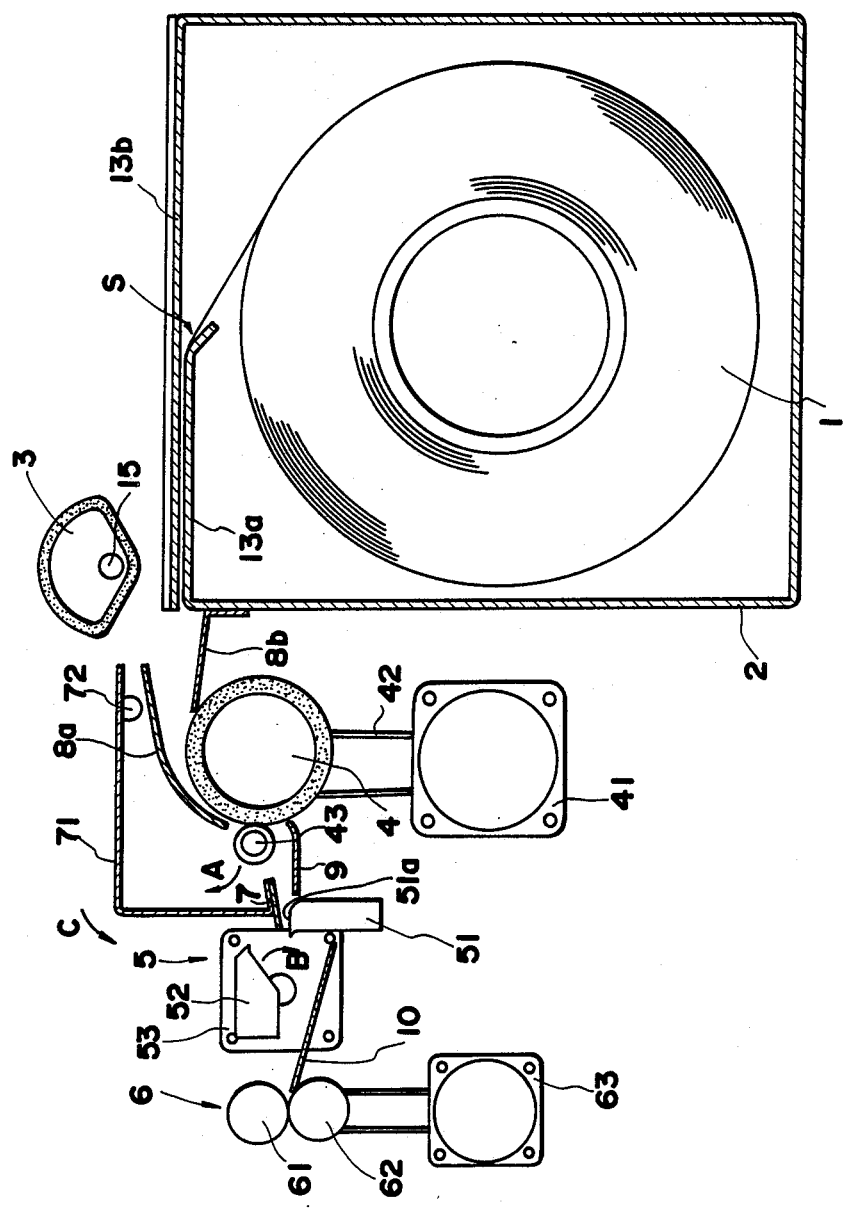
FIG. 1 is a sectional view schematically showing the construction of a device embodying the invention for cutting a strip of paper from a roll.

FIG. 1 shows the overall construction of a device embodying the invention for cutting a strip of paper from a roll 1. The paper roll 1 is accommodated in a magazine 2. A dispenser roller 3, delivery roller 4, cutter 5 and sheet transport roller means 6 are arranged in this order along the direction of delivery of the paper from the magazine 2.

Figure 2:
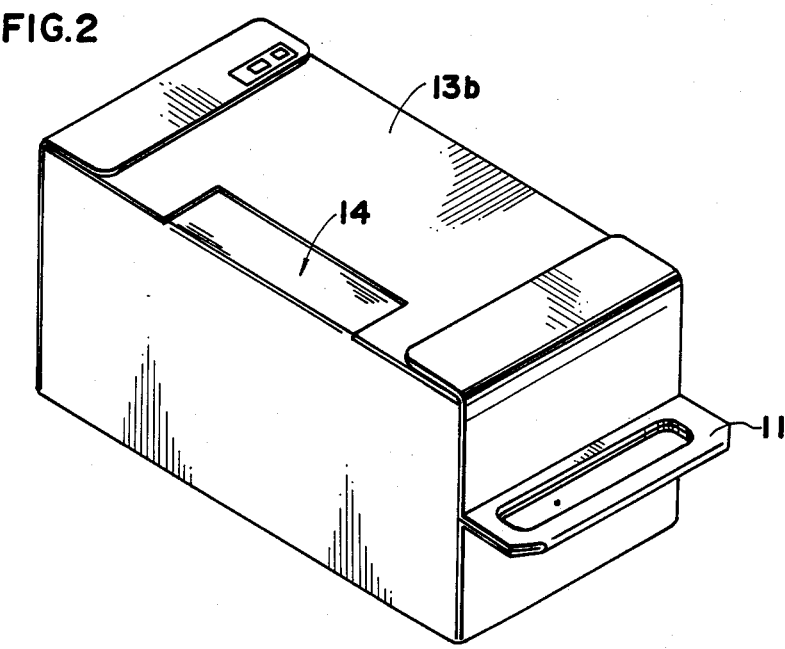
FIG. 2 is a perspective view of a magazine for accommodating the roll.
Figure 3:
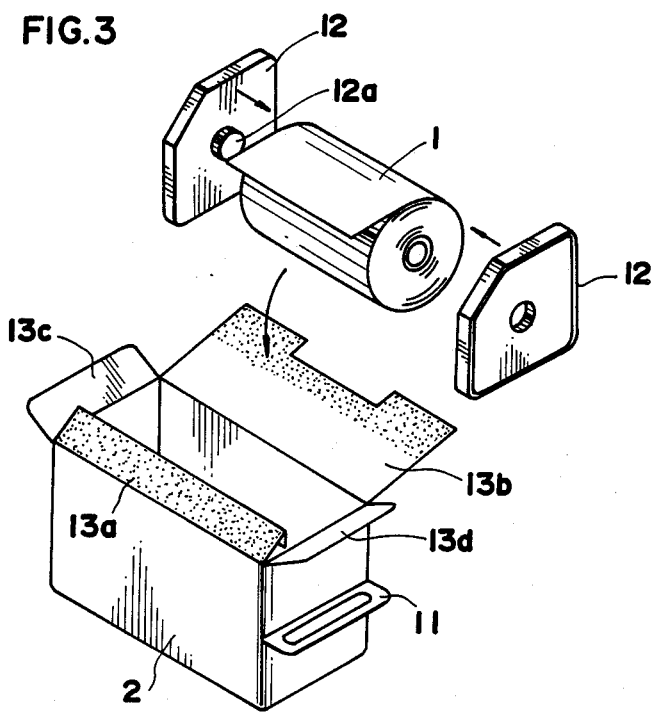
FIG. 3 is an exploded perspective view of the magazine shown in FIG. 2.

With reference to FIGS. 2 and 3, the magazine 2 is in the form of a box having a knob or handle 11 on one side wall thereof. The magazine is assembled by placing the paper roll 1 rotatably supported by studs 12a, 12a on side plates 12, 12 into the box through an open top side thereof and thereafter folding top flaps 13a, 13b, 13c and 13d to close the top side. Of the folds 13a to 13d, the opposed flaps 13a, 13b are folded one over the other and positioned along the direction of pay-off of the strip of paper 1 to define a passage S for the strip. The upper flap 13b is formed with a cutout 14 centrally thereof for the dispenser roller 3 to advance into the passage S therethrough.

The dispenser roller 3 has a sectorial cross section so as not to interfere with the magazine 2 when it is removed, and is reversibly rotatable about a central shaft 15 by an unillustrated motor. With the magazine 2 set in position, the circular-arc peripheral surface of the roller 3 acts on the paper strip 1 exposed at the cutout 14 in the magazine flap 13b to pay off the strip toward the delivery roller 4 when the roller 3 rotates forward or to return the strip into the magazine when the roller 3 rotates reversely.

Figure 4:
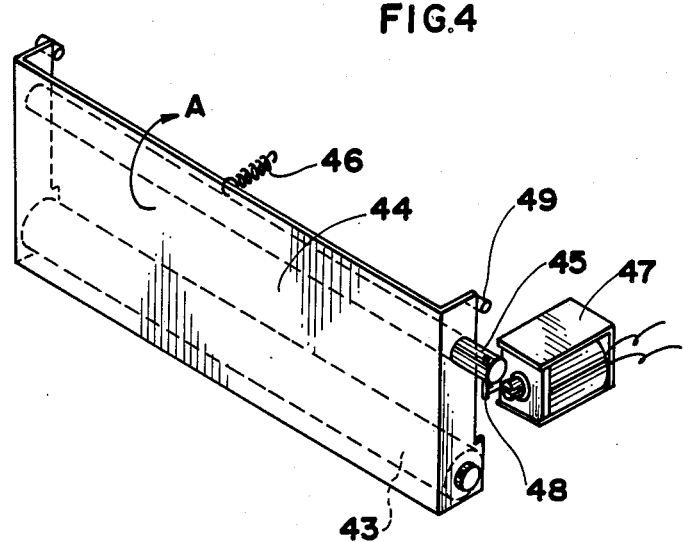
FIG. 4 is a perspective view showing a support assembly for a pressure roller included in the device.

The delivery roller 4 has a large diameter for forwarding the strip 1 toward the cutter 5 by a required length and is driven by a loading motor 41 through a belt 42. Opposed to the roller 4 is a pressure roller 43 of small diameter for pressing the strip into pressing contact with the roller 4. As seen in FIG. 4, the pressure roller 43 is rotatably supported by a frame 44 formed by bending opposite ends of a flat plate. The frame 44 is rotatably supported by a rod 45 on the unillustrated frame of the cutting device and biased by a tension spring 46 into rotation in a direction (direction of arrow A) to move the pressure roller 43 out of pressing contact with the delivery roller 4. On the other hand, the rod 45 is connected to a solenoid 47 by an arm 48. When the solenoid 47 is energized, the rod 45 rotates the frame 44 in a direction opposite to the direction A to move the roller 43 into pressing contact with the delivery roller 4. Indicated at 49 in the drawing is a stopper for limiting the range of rotation of the frame 44.

The cutter 5 comprises a lower blade 51 and an upper blade 52. The lower blade 51 is fixed in position, while the upper blade 52 is mounted on the shaft of a cutter motor 53 to serve as a rotary blade rotatable in the direction of arrow B by the operation of the cutter motor 53. The fixed blade 51 has a flat face 51a at its top. A holding plate 7 for holding the leading end of the paper strip is opposed to and disposed above the flat face 51a.

Figure 5:
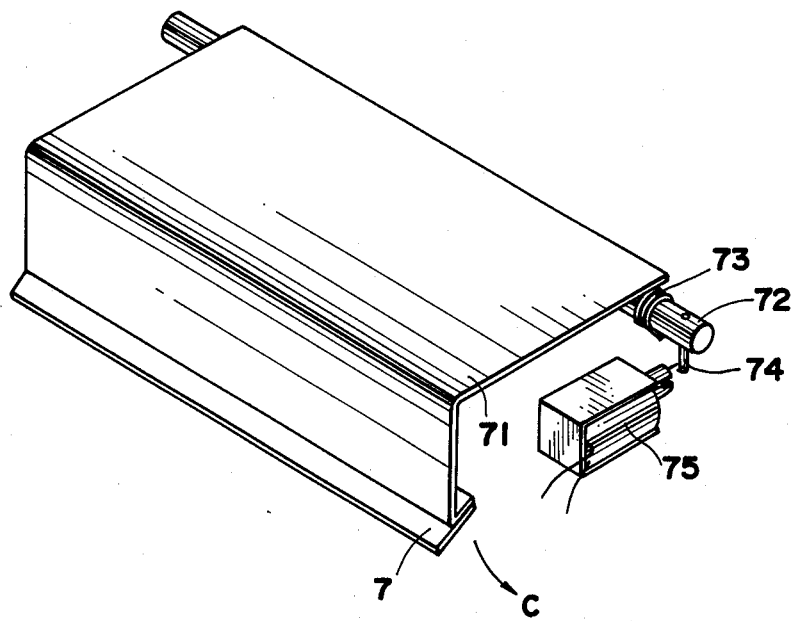
FIG. 5 is a perspective view showing means included in the device for holding the leading end of the strip.

As seen in FIG. 5, the holding plate 7 is attached to the forward end of a frame 71 bent to an L-shape. The frame 71 is rotatably supported at its base end by a rod 72 on the unillustrated frame of the cutting device and is always biased by a spring 73 into rotation in a direction (direction of arrow C) to press the leading end of paper strip against the top face 51a of the lower blade 51. On the other hand, a solenoid 75 is connected to the rod 72 by the arm 74. When energized, the solenoid 75 rotates the frame 71 toward a direction opposite to the direction C to release the leading end of the strip from pressing contact with the top face 51a.

The sheet transport roller means 6 comprises a pair of upper and lower rollers 61, 62 for nipping therebetween a sheet of paper having the required length and cut off by the cutter 5. While the upper roller 61 is free to rotate, the lower roller 62 is drivingly rotatable by a transport motor 63.

FIG. 1 further shows upper and lower guide plates 8a, 8b for guiding the paper strip 1 to the delivery roller 4, a lower guide plate 9 for guiding the strip 1 from the delivery roller 4 to the position of the cutter 5, and a lower guide plate 10 for guiding the cut-off sheet of paper to the transport roller means 6.

Figure 6:
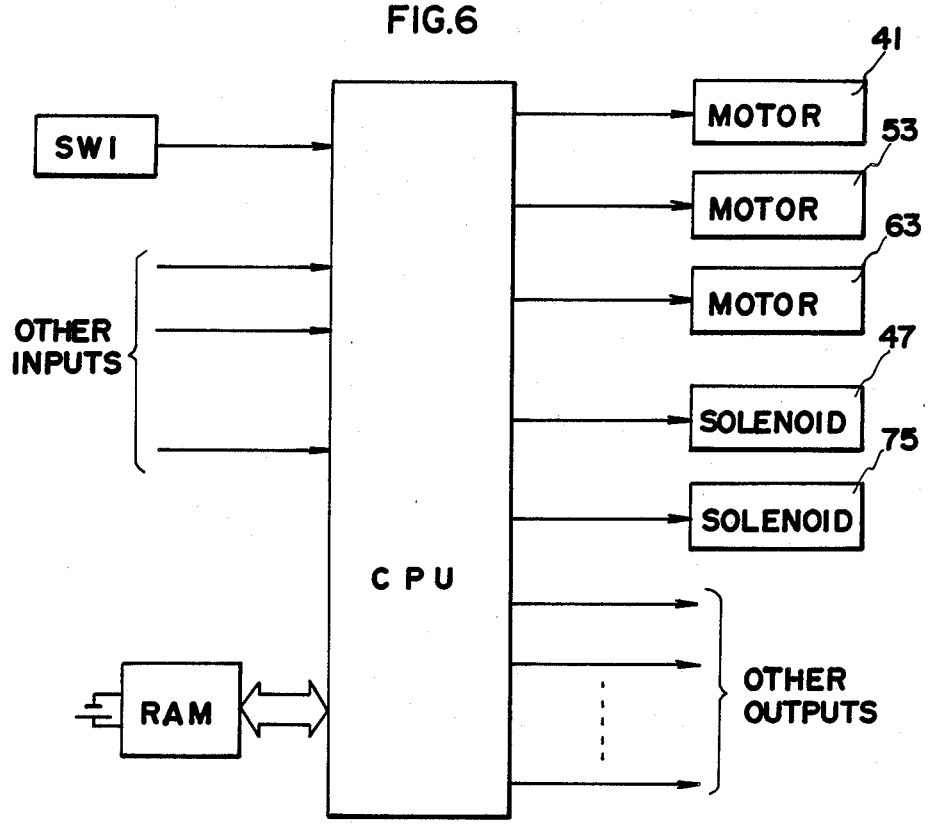
FIG. 6 is a block diagram showing the control circuit of the device.

FIG. 6 is a block diagram showing the control circuit of the cutting device.

A microcomputer CPU is provided with output ports having connected thereto the loading motor 41, the solenoid 47 for the pressure roller 43, the cutter motor 53, the solenoid 75 for releasing the strip leading end and the transport motor 63. These motors and solenoids receive control signals from the microcomputer CPU for ON/OFF control. The microcomputer CPU further has an input port for receiving a start signal from a start switch SW1. The motors and solenoids are controlled in response to the start signal from the switch SW1.

The operation of the cutting device will be described below. With the magazine 2 set in position within the frame of the device, an instruction for an initial paper feed operation to initialize the device is first given to the control circuit, whereupon the pressure roller 43 is brought into pressing contact with the delivery roller 4, and the strip end release solenoid 75 is energized to raise the holding plate 7. The dispenser roller 3 and the delivery roller 4 then start rotating. The circular-arc peripheral surface of the dispenser roller 3 is brought into contact with the leading end of paper strip 1 by one-half of a revolution of the roller 3 to withdraw the strip 1 from the magazine 2. Approximately when the dispenser roller 3 has rotated by one revolution and a half, the leading end of the strip is passed through the cutter 5 and is forwarded beyond the pair of transport rollers 6. The dispenser roller 3 stops when brought out of contact with the strip after making two revolutions. The delivery roller 4, which is still in rotation at this time, stops after sending out a predetermined length of paper strip 1. Subsequently, the cutter 5 operates to cut the strip. The sheet of paper cut off the strip is forwarded by the pair of transport rollers 6. However, the sheet thus cut off by the initial feed operation is not used but discarded. Immediately after the operation of the cutter 5, on the other hand, the end release solenoid 75 is deenergized, causing the holding plate 7 to press the resulting leading end of the strip against the flat top face 51a of the fixed blade 51 under the action of the spring 73. The strip 1 is thus held at the edge of its leading end, and the held portion is outside the image forming area of the strip when it is copy paper. Immediately after the strip leading end has been held, the solenoid 47 for the pressure roller 43 is deenergized to move this roller away from the delivery roller 4. Until the start switch SW1 is depressed, the device remains in this state. Thus, the device is completely initialized and held in a stand-by state.

Figure 7:
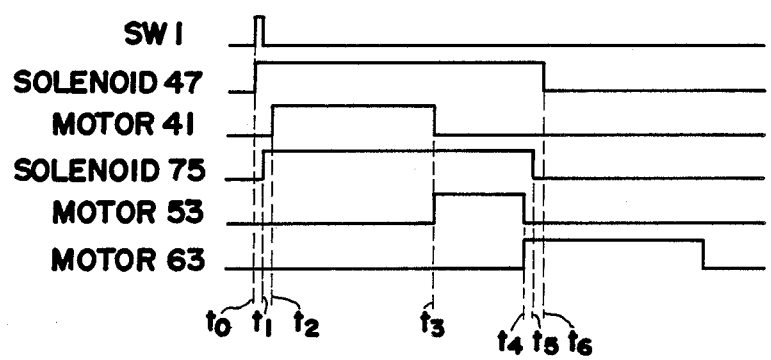
FIG. 7 is a timing chart for illustrating the operation of main components of the device with respect to time.

Subsequently, the start switch SW1 is depressed to bring the image forming apparatus, incorporating the present device, into an image forming operation, whereupon the solenoids and the motors are energized according to the time chart shown in FIG. 7. Stated more specifically, when the start switch SW1 is depressed at time t0, the solenoid 47 is immediately energized, whereby the paper strip is nipped between the pressure roller 43 and the delivery roller 4. With a slight delay, the solenoid 75 is energized at time t1 to release the strip leading end from the holding plate 7. On completion of this release action, the loading motor 41 is initiated into rotation at time t2, starting to deliver the strip. When the strip is paid off by the required length, the motor 41 is brought out of rotation at time t3, and at the same time, the cutter motor 53 is energized. The strip is cut at time t4 by the rotation of the motor 53, whereupon the motor 53 is deenergized. Simultaneously with this, the transport motor 63 starts rotation to transport the sheet of paper cut off by the cutter 5. Subsequently, at time t5 after the cutting of of the strip with the cutter 5, the end release solenoid 75 is deenergized, permitting the holding plate 7 to hold the resulting leading end of the strip. At time t6 thereafter, the solenoid 47 is deenergized to free the pressure roller 43. This state is maintained until the start switch is subsequently depressed. When the start switch is depressed next, the cutting device operates again according to the time chart of FIG. 7.

As will be apparent from the foregoing description, the device of the invention for cutting a strip of paper in the form of a roll is so adapted that after the strip has been cut, the holding means holds the strip leading end in pressing contact therewith, whereupon the strip is released from pressing contact with the delivery roller. According, even when the paper strip is allowed to stand without cutting for a prolonged period of time, no impression is left on the sheet of paper thereafter cut off in its image forming area, permitting the sheet to retain the desired quality.

Additionally, since the strip is held at its leading end while being allowed to stand, the strip can be cut in the specified length with high accuracy when thereafter forwarded and cut.

Although the present invention has been fully described by way of example with reference to the accompanying drawings, it is to be noted that various changes and modifications will be apparent to those skilled in the art. Therefore, unless otherwise such changes and modifications depart from the scope of the invention, they should be construed as being included therein.

What is claimed is:

1. A device, which is used as a feeder for cutting a strip of recording medium in the form of a roll into sheets and feeding each sheet, comprising:

delivery means for drawing out the strip of recording medium from the roll and for transporting the strip, said delivery means being movable between a first position where the delivery means nips the strip and a second position where the delivery means is retracted from the strip;

cutting means disposed downstream from the delivery means with respect to the direction of delivery of the strip for cutting the strip into the sheet as transported by the delivery means by a specified length;

holding means provided between the delivery means and the cutting means for holding the leading end of the strip drawn out by the delivery means from the roll; and control means for controlling operation of the delivery means and holding means, for first energizing the holding means to hold the leading end of the strip from the roll after a cutting operation of said cutting means and for thereafter retracting the delivery means to the second position, and for causing the leading end of the strip to be held by the holding means and said delivery means to be retracted from the strip to the second position until a successive drawing out operation of said delivery means.

2. A device as claimed in claim 1, wherein said delivery means includes a pair of delivery rollers for transporting the strip of the recording medium from the roll in nipping contact therewith, and said pair of delivery rollers are in contact with each other at the first position and are separate from each other at the second position.

3. A device as claimed in claim 2, wherein one of said pair of delivery rollers is provided at a fixed position and the other one of said pair of delivery rollers is movably provided between the first position and the second position.

4. A device as claimed in claim 3, wherein said cutting means includes a fixed lower blade and an upper blade, and the upper blade is movable with respect to the lower blade.

5. A device as claimed in claim 4, wherein said lower blade has a flat face which is spaced opposed to the transporting path of the strip, and said holding means includes a holding plate which is disposed above the flat face and is movable between a position where the holding plate and the flat face of the lower blade nip the leading end of the strip of recording medium from the roll and a position where the holding plate is retracted from the flat face of the lower blade.

6. A device, which is used as a feeder for cutting a strip of recording medium in the form of a roll into sheets and feeding each sheet, comprising:

delivery means for drawing out the strip of recording medium from the roll and for transporting the strip, said delivery means being movable between a first position where the delivery means nips the strip and a second position where the delivery means is retracted from the strip;

cutting means disposed downstream from the delivery means with respect to the direction of delivery of the strip for cutting the strip into the sheet as transported by the delivery means by a specified length, said cutting means including a fixed lower blade having a flat face opposed to the transporting path of the strip and an upper blade movable with respect to the lower blade;

a holding plate disposed above the flat face and being movable between a position where the holding plate and the flat face of the lower blade nip the leading end of the strip of recording medium from the roll and a position where the holding plate is retracted from the flat face of the lower blade; and control means for controlling operation of the delivery means and holding plate, for first moving the holding plate to nip the leading end of the strip from the roll after a cutting operation of said cutting means and for thereafter retracting the delivery means to the second position, and for causing the leading end of the strip to be held by the holding means and said delivery means to be retracted from the strip to the second position until a successive drawing out operation of said delivery means.

7. A device as claimed in claim 6, wherein said delivery means includes a pair of delivery rollers for transporting the strip of the recording medium from the roll in nipping contact therewith, and said pair of delivery rollers are in contact with each other at the first position and are separate from each other at the second position.

8. A device as claimed in claim 7, wherein one of said pair of delivery rollers is provided at a fixed position and the other one of said pair of delivery rollers is movably provided between the first position and the second position.

9. A device, which is used as a feeder for cutting a strip of recording medium in the form of a roll into sheets and feeding each sheet, comprising:

delivery means for drawing out the strip of recording medium from the roll and transporting the strip, said delivery means being movable between a first position where the delivery means nips the strip and a second position where the delivery means is retracted from the strip;

cutting means disposed downstream from the delivery means with respect to the direction of delivery of the strip for cutting the strip into the sheet as transported by the delivery means by a specified length;

holding means provided between the delivery means and the cutting means for holding the leading end of the strip from the roll which is cut by the cutting means; and control means for controlling operation of the delivery means, the cutting means, and the holding means, said control means first energizing the delivery means to transport the strip, and for after a predetermined period of time energizing the cutting means to cut the strip into the sheet, and for subsequently energizing the holding means to hold the leading end of the strip from the roll and for thereafter retracting the delivery means to the second position, and for causing the leading end of the strip to be held by the holding means and said delivery means to be retracted from the strip until a successive drawing out operation of said delivery means.

10. A device as claimed in claim 9, wherein said delivery means includes a pair of delivery rollers for transporting the strip of the recording medium from the roll in nipping contact therewith, and said pair of delivery rollers are in contact with each other at the first position and are separate from each other at the second position.

11. A device as claimed in claim 10, wherein one of said pair of delivery rollers is provided at a fixed position and the other one of said pair of delivery rollers is movably provided between the first position and the second position.

12. A device as claimed in claim 11, wherein said cutting means includes a lower blade fixed in position and an upper blade movable with respect to the lower blade.

13. A device as claimed in claim 12, wherein said lower blade has a flat face which is spaced opposed to the transporting path of the strip, and said holding means includes a holding plate which is disposed above the flat face and is movable between a position where the holding plate and the flat face of the lower blade nip the leading end of the strip of recording medium from the roll and a position where the holding plate is retracted from the flat face of the lower blade.

14. A device, which is used as a feeder for cutting a strip of recording medium in the form of a roll into sheets and feeding each sheet, comprising:
   delivery means for drawing out the strip of recording medium from the roll and transporting the strip, said delivery means being movable between a first position where the delivery means nips the strip and a second position where the delivery means is retracted from the strip;
   cutting means disposed downstream from the delivery means with respect to the direction of delivery of the strip for cutting the strip into the sheet as transported by the delivery means by a specified length, said cutting means including a fixed lower blade having a flat face spaced opposed to the transporting path of the strip and an upper blade movable with respect to the lower blade;
   a holding plate disposed above the flat face and movable between a position where the holding plate and the flat face of the lower blade nip the leading end of the strip of recording medium from the roll which is cut by the cutting means and a position where the holding plate is retracted from the flat face of the lower blade; and
   control means for controlling operation of the delivery means, the cutting means, and the holding plate, said control means first driving the delivery means to transport the strip, and for after a predetermined period of time driving the cutting means to cut the strip into the sheet, for subsequently moving the holding plate to nip the leading end of the strip from the roll and for thereafter retracting the delivery means to the second position, and for causing the leading end of the strip to be held by the holding means and said delivery means to be retracted from the strip until a following delivery operation of said delivery means.

15. A device as claimed in claim 14, wherein said delivery means includes a pair of delivery rollers for transporting the strip of the recording medium from the roll in nipping contact therewith, and said pair of delivery rollers are in contact with each other at the first position and are separate from each other at the second position.

16. A device as claimed in claim 15, wherein one of said pair of delivery rollers is provided at a fixed position and the other one of said pair of delivery rollers is movably provided between the first position and the second position.

17. A device, which is used as a feeder for cutting a strip of recording medium in the form of a roll into sheets and feeding each sheet, comprising:
   delivery means for drawing out the strip of recording medium from the roll, said delivery means being movable between a first position where the delivery means nips the strip and a second position where the delivery means is retracted from the strip;
   cutting means disposed downstream from the delivery means with respect to the direction of drawing out of the strip for cutting the strip into the sheet as drawn out by the delivery means by a specified length;
   holding means provided between the delivery means and the cutting means for holding the leading end of the strip from the roll;
   generating means for generating a start signal for starting a cutting operation; and
   control means for controlling operation of the delivery means, holding means, and cutting means, for first moving the delivery means to the first position to nip the strip in response to said start signal generated by said generating means, and for thereafter releasing the hold of the holding means, for drawing out the strip by the specified length, cutting the strip drawn out by the specified length, energizing the holding means to hold the leading end of the strip from the roll, and for thereafter retracting the delivery means to the second position, and for causing the leading end of the strip to be held by the holding means in the state that said delivery means is retracted from the strip during a waiting period between cutting operations.

18. A device as claimed in claim 17, wherein said delivery means includes a pair of delivery rollers for transporting the strip of the recording medium from the roll in nipping contact therewith, and said pair of rollers are in contact with each other at the first position and are separate from each other at the second position.

19. A device as claimed in claim 18, wherein one of said pair of delivery rollers is provided at a fixed position and the other one of said pair of rollers is movably provided between the first position and the second position.

20. A device as claimed in claim 19, wherein said cutting means includes a fixed lower blade and an upper blade movable with respect to the lower blade.

21. A device as claimed in claim 20, wherein said lower blade has a flat face which is spaced opposed to the transporting path of the strip, and said holding means includes a holding plate which is disposed above the flat face and is movable between a position where the holding plate and the flat face of the lower blade nip the leading end of the strip of recording medium from the roll and a position where the holding plate is retracted from the flat face of the lower blade.

* * * * *